United States Patent
Campbell

(10) Patent No.: US 8,072,536 B1
(45) Date of Patent: Dec. 6, 2011

(54) WEB CAM APPARATUS

(76) Inventor: Sean Campbell, Laurelton, NY (US)

( * ) Notice: Subject to any disclaimer, the term of this patent is extended or adjusted under 35 U.S.C. 154(b) by 459 days.

(21) Appl. No.: 12/397,036

(22) Filed: Mar. 3, 2009

(51) Int. Cl.
*H04N 5/225* (2006.01)

(52) U.S. Cl. ........ 348/373; 348/143; 348/374; 348/375; 348/376

(58) Field of Classification Search .................. 348/143, 348/373–376; 248/278.1; 396/419, 427, 396/428, 535; D16/200–205, 208, 218
See application file for complete search history.

(56) References Cited

U.S. PATENT DOCUMENTS

| | | | |
|---|---|---|---|
| 5,752,113 A * | 5/1998 | Borden | 396/428 |
| 5,881,321 A | 3/1999 | Kivolowitz | |
| 6,124,886 A * | 9/2000 | DeLine et al. | 348/148 |
| 6,679,467 B1 * | 1/2004 | Softness | 248/278.1 |
| 6,822,857 B2 * | 11/2004 | Jung et al. | 361/679.02 |
| 7,009,561 B2 | 3/2006 | Menache et al. | |
| D542,820 S | 5/2007 | Depay | |
| D589,996 S * | 4/2009 | Kellar et al. | D16/203 |
| 7,559,520 B2 * | 7/2009 | Quijano et al. | 248/309.1 |
| 2004/0001137 A1 * | 1/2004 | Cutler et al. | 348/14.08 |
| 2005/0151042 A1 * | 7/2005 | Watson | 248/226.11 |
| 2006/0027718 A1 * | 2/2006 | Quijano et al. | 248/121 |
| 2007/0070205 A1 | 3/2007 | Huang et al. | |
| 2007/0165372 A1 | 7/2007 | Ye | |
| 2007/0222888 A1 | 9/2007 | Xiae et al. | |
| 2008/0008467 A1 * | 1/2008 | Liu | 396/427 |

* cited by examiner

*Primary Examiner* — Yogesh Aggarwal
(74) *Attorney, Agent, or Firm* — Crossley Patent Law; Mark A. Crossley

(57) ABSTRACT

The web cam apparatus provides for a web cam to automatically track a user when the user moves out of a previously direct frame of the web cam. More than one mount type is provided so that various web cams and monitors with web cams can be accommodated. The apparatus also provides more than one remote airwave transmitter. Each transmitter is kept on a web cam user's person so that tracking is automatic. One transmitter provides only web cam tracking. A headset optionally provided provides further communication with a computer that is equipped with both a transmitter and receiver. A computer so equipped can also communicate sounds between the headset and the computer.

16 Claims, 4 Drawing Sheets

WEB CAM APPARATUS

BACKGROUND OF THE INVENTION

Web cams are in widespread usage among computer users. A problem exists in that a typical web cam sees only a limited field of vision. If a computer user moves of frame, either part of or the entire user is omitted from web cam view. The present apparatus provides a means for automatic web cam coverage and further communication with a user who moves while using a computer web cam.

FIELD OF THE INVENTION

The web cam apparatus relates to computer cameras known as web cams and more especially to an apparatus that provides for a web cam user to be in visual and audio communication with a computer and web cam even when moving away from a direct position in front of the web cam.

SUMMARY OF THE INVENTION

The general purpose of the web cam apparatus, described subsequently in greater detail, is to provide a web cam apparatus which has many novel features that result in an improved web cam apparatus which is not anticipated, rendered obvious, suggested, or even implied by prior art, either alone or in combination thereof.

To attain this, the web cam apparatus provides for a web cam to automatically track a user when the user moves out of a previously direct frame of the web cam. More than one mount type is provided so that various web cams and monitors with web cams can be accommodated. The apparatus also provides more than one remote airwave transmitter. Each transmitter is kept on a web cam user's person so that tracking is automatic. One transmitter provides only web cam tracking. A headset optionally provided provides further communication with a computer that is equipped with both a transmitter and receiver. A computer so equipped can also communicate sounds between the headset and the computer.

Thus has been broadly outlined the more important features of the improved web cam apparatus so that the detailed description thereof that follows may be better understood and in order that the present contribution to the art may be better appreciated.

An object of the web cam apparatus is to provide for a web cam to automatically track a user's movement.

Another object of the web cam apparatus is to provide rotational movement of a web cam.

A further object of the web cam apparatus is to provide pivotal movement of a web cam.

An added object of the web cam apparatus is to provide a flexible stalk for mounting a web cam.

And, an object of the web cam apparatus is to provide sound communication between a computer and a user.

These together with additional objects, features and advantages of the improved web cam apparatus will be readily apparent to those of ordinary skill in the art upon reading the following detailed description of presently preferred, but nonetheless illustrative, embodiments of the improved web cam apparatus when taken in conjunction with the accompanying drawings.

In this respect, before explaining the current embodiments of the improved web cam apparatus in detail, it is to be understood that the web cam apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved web cam apparatus. It is therefore important that the claims be regarded as including such equivalent constructions insofar as they do not depart from the spirit and scope of the web cam apparatus.

It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 7 thereof, the principles and concepts of the web cam apparatus generally designated by the reference number 10 will be described.

Figure 1:
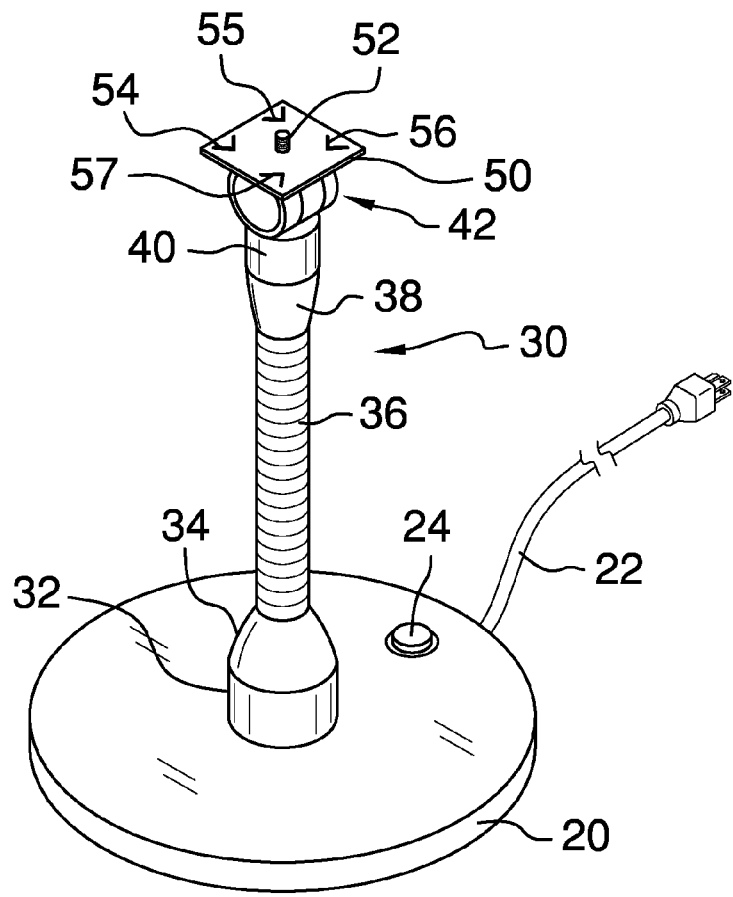
FIG. 1 is a perspective view of the base and stalk assembly with one embodiment of the mount.
Figure 2:
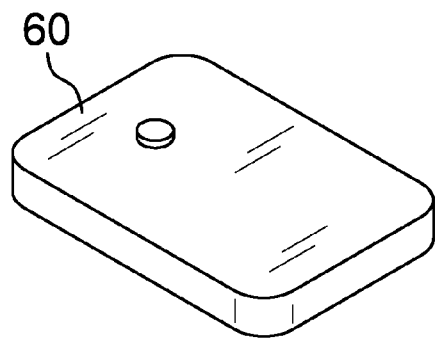
FIG. 2 is a frontal perspective view of the transmitter.
Figure 3:
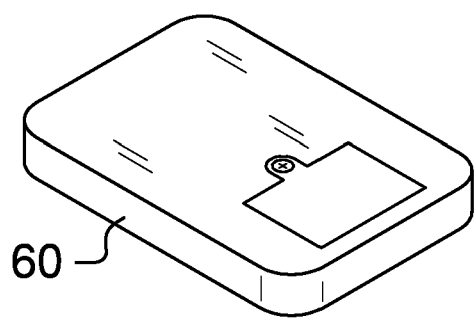
FIG. 3 is a rear perspective view of the transmitter.
Figure 6:
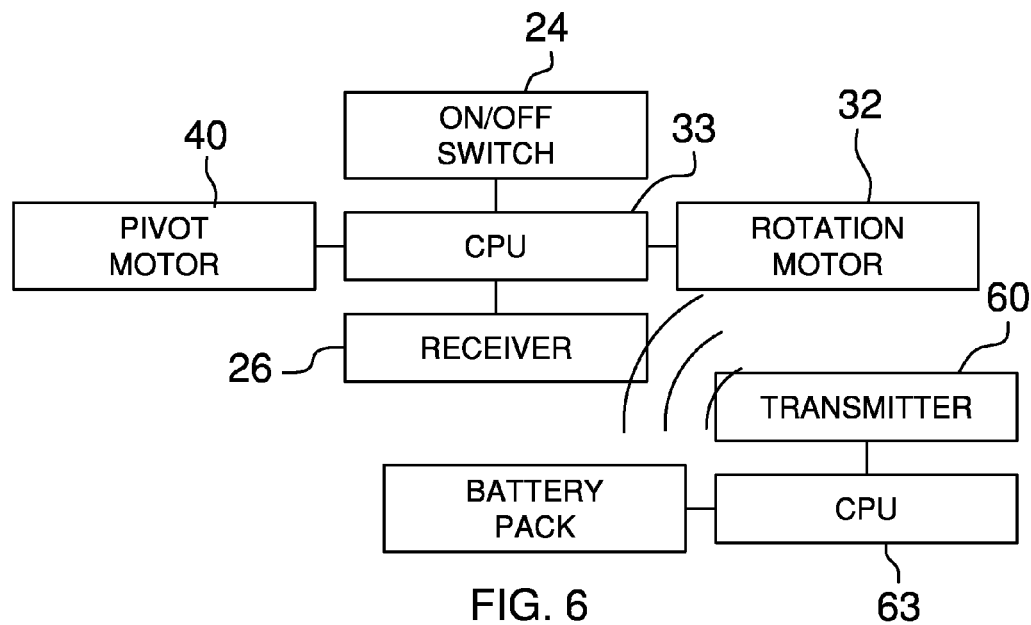
FIG. 6 is a schematic block diagram of the relationship of electronic components of the apparatus.
Figure 7:
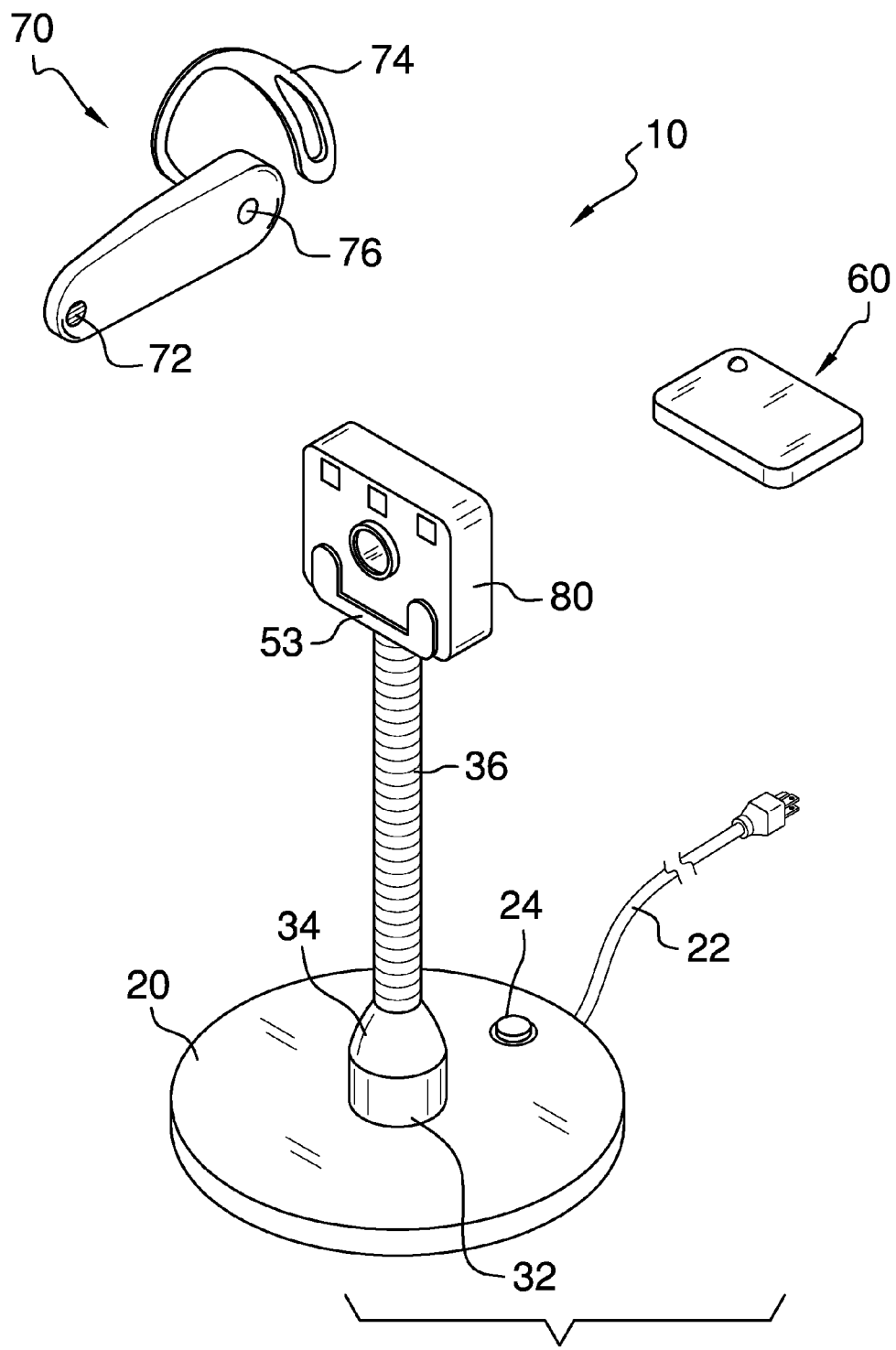
FIG. 7 is a perspective view of the apparatus with an alternate embodiment of the mount.

Referring to FIGS. 1 and 6, the web cam apparatus 10 partially comprises the circular weighted base 20. The first CPU 33 is disposed within the base 20. An on/off switch 24 is disposed within the base 20. The on/off switch 24 is in communication with the first CPU 33.

Figure 4:
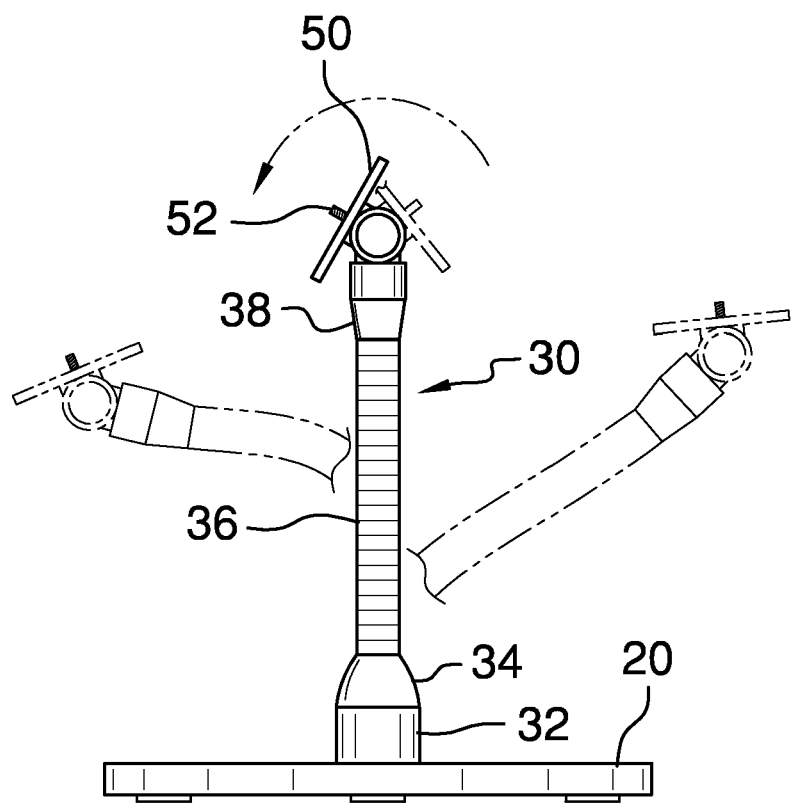
FIG. 4 is a front elevation view of the base and stalk assembly illustrating selective stalk positioning and pivot plate pivot.
Figure 5:
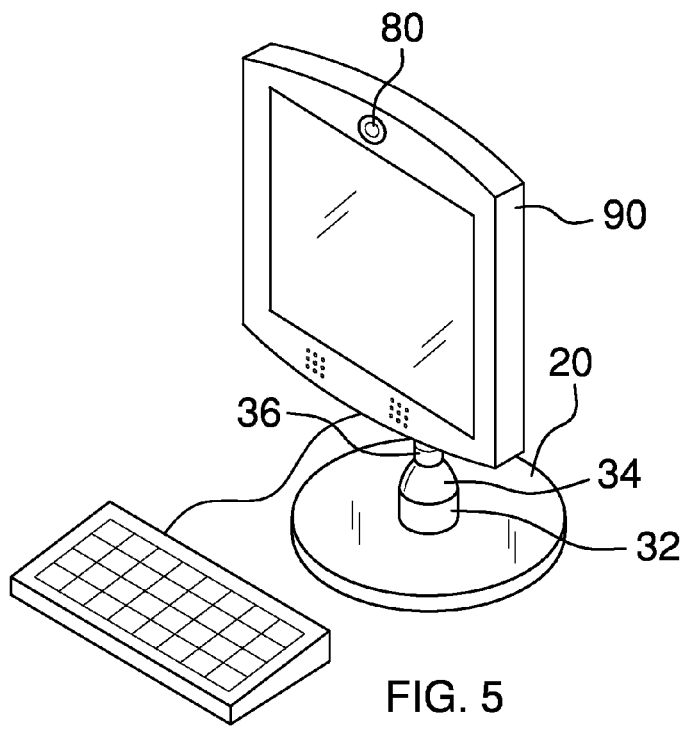
FIG. 5 is a perspective view of the base and stalk assembly in use with a web cam mounted on a monitor.

Continuing to refer to FIGS. 1 and 6 and also to FIGS. 4 and 5, the stalk assembly 30 is disposed atop the base 20. The stalk assembly 30 is partially comprised of the rotation motor 32 which is disposed in about a center of the base 20. The rotation motor 32 is in communication with the first CPU 33. The stalk assembly 30 further comprises the first tapered flange 34 disposed atop the rotation motor 32. The first tapered flange 34 is in rotational relationship with the rotation motor 32. The stalk assembly 30 further comprises the flex stalk 36 affixed to the first tapered flange 34. The first tapered flange 34 and the flex stalk 36 are selectively rotated by the rotation motor 32. The stalk assembly 30 further comprises the second tapered flange 38 disposed atop the flex stalk 36. Continuing with the stalk assembly 30, the pivot motor 40 is disposed atop the second tapered flange 38. The pivot motor 40 is in communication with the first CPU 33. The stalk assembly 30 continues further with the pivot assembly 42 disposed atop the pivot motor 40. The pivot plate 50 disposed atop the pivot assembly 42 tops the stalk assembly 30. The first CPU 33 selectively pivots the pivot plate 50. The pivot plate 50 further comprises the adjustable mount 52 disposed atop the pivot plate 50. The pivot plate 50 further features the quartet of spaced apart slots. The slots comprise the first slot 54, the second slot 55, the third slot 56, and the fourth slot 57.

The slots and adjustable mount 52 aid in mounting various computer monitors 90. The slots and adjustable mount 52 also aid in mounting various web cams 80.

Referring to FIGS. 2, 3, and 7, and again to FIG. 6, the remote battery powered transmitter 60 is provided. A second CPU 63 is disposed within the transmitter 60. The second CPU 63 is in communication with the first CPU 33. Optionally, communication can occur via more than one air transmitted means. The first CPU 33 automatically rotates the stalk 36 and pivots the pivot plate 50 such that a web cam 80 either alone or within or attached to a monitor 90 tracks the transmitter 60.

Referring to FIG. 7 and again to FIG. 6, the alternate embodiment of the stalk assembly 30 features an alternate mount that comprises a camera sleeve bracket 53. The sleeve bracket 53 slideably receives a variety of web cams 80. Web cams 80 are selectively fitted within the sleeve bracket 53 and selectively removed as chosen. Except for the camera sleeve bracket 53, the stalk assembly 30 is identical to that illustrated in FIGS. 1, 4, and 5. A further option of the apparatus 10 provides not only the transmitter 60 but also a choice of a headset 70 that can be used instead of the transmitter 60. A receiver 26 and a transmitter 60 are disposed within the headset 70. A microphone 72 is disposed within the headset 70. Additionally, an earphone 76 is disposed within the headset 70. The headset 70 also features a flexible headband 74 for selective retention on a user. A second CPU 63 is also disposed within the headset 70. The second CPU 63 is in communication with the receiver 26 and transmitter 60, the microphone 72, the earphone 76, and via airwave with the first CPU 33.

The first CPU 33 automatically rotates the stalk 36 and pivots the pivot plate 50 such that a web cam 80 tracks the transmitter 60. The power cord 22 provides power to the stalk assembly 30. The power cord 22 is available in more than one embodiment. In addition to the electrical outlet embodiment illustrated, the power cord 22 is also available in an embodiment that uses a computer USB port for power.

With respect to the above description then, it is to be realized that the optimum dimensional relationships for the parts of the web cam apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the web cam apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the web cam apparatus may be used.

Therefore, the foregoing is considered as illustrative only of the principles of the web cam apparatus. Further, since numerous modifications and changes will readily occur to those skilled in the art, it is not desired to limit the web cam apparatus to the exact construction and operation shown and described, and accordingly, all suitable modifications and equivalents may be resorted to, falling within the scope of the web cam apparatus.

What is claimed is:

1. A web cam apparatus, comprising, in combination:
a circular weighted base
a first CPU within the base;
a receiver disposed within the base, the receiver in communication with the first CPU;
an on/off switch in the base, the on/off switch in communication with the first CPU;
a stalk assembly affixed atop the base, the stalk assembly comprising:
a rotation motor disposed in about a center of the base, the rotation motor in communication with the first CPU;
a first tapered flange disposed atop the rotation motor;
a stalk affixed to the first tapered flange, the first tapered flange and the stalk selectively rotated by the rotation motor;
a second tapered flange disposed atop the stalk;
a pivot motor disposed atop the second tapered flange, the pivot motor in communication with the first CPU;
a pivot assembly disposed atop the pivot motor;
a pivot plate disposed atop the pivot assembly, the pivot plate selectively pivoted by the first CPU;
a mount disposed atop the pivot plate, the mount selectively affixed to an existing computer monitor with a web cam, the mount further selectively affixed to a stand-alone web cam;
a remote battery powered transmitter;
a second CPU within the transmitter, the second CPU in communication with the first CPU, the first CPU automatically rotating the stalk and pivoting the pivot plate such that the web cam and the monitor track the transmitter.

2. The apparatus according to claim 1 wherein the mount disposed atop the pivot plate is further adjustable.

3. The apparatus according to claim 1 wherein the stalk is further a flex stalk.

4. The apparatus according to claim 2 wherein the stalk is further a flex stalk.

5. The apparatus according to claim 1 wherein the pivot plate further comprises a quartet of spaced apart slots.

6. The apparatus according to claim 2 wherein the pivot plate further comprises a quartet of spaced apart slots.

7. The apparatus according to claim 3 wherein the pivot plate further comprises a quartet of spaced apart slots.

8. The apparatus according to claim 4 wherein the pivot plate further comprises a quartet of spaced apart slots.

9. A web cam apparatus, comprising, in combination:
a circular weighted base
a first CPU within the base;
a receiver disposed within the base, the receiver in communication with the first CPU;
an on/off switch in the base, the on/off switch in communication with the first CPU;
a rotation motor disposed in about a center of the base, the rotation motor in communication with the first CPU;
a first tapered flange disposed atop the rotation motor;
a stalk affixed to the first tapered flange, the first tapered flange and the stalk selectively rotated by the rotation motor;
a second tapered flange disposed atop the stalk;
a pivot motor disposed atop the second tapered flange, the pivot motor in communication with the first CPU;
a pivot assembly disposed atop the pivot motor;
a pivot plate disposed atop the pivot assembly, the pivot plate selectively pivoted by the first CPU;
a mount disposed atop the pivot plate;
an existing web cam selectively affixed to the mount;
a battery powered remote headset;
a receiver disposed within the headset;
a transmitter disposed within the headset;
a microphone disposed within the headset;
an earphone disposed within the headset;
a second CPU disposed within the headset, the second CPU in communication with the receiver, the transmitter, the microphone, the earphone, and the first CPU, the first CPU automatically rotating the stalk and pivoting the pivot plate such that the web cam tracks the transmitter.

10. The apparatus according to claim 9 wherein the mount disposed atop the pivot plate is further adjustable.

11. The apparatus according to claim 9 wherein the stalk is further a flex stalk.

12. The apparatus according to claim 10 wherein the stalk is further a flex stalk.

13. The apparatus according to claim 9 wherein the pivot plate further comprises a quartet of spaced apart slots.

14. The apparatus according to claim 10 wherein the pivot plate further comprises a quartet of spaced apart slots.

15. The apparatus according to claim 11 wherein the pivot plate further comprises a quartet of spaced apart slots.

16. The apparatus according to claim 12 wherein the pivot plate further comprises a quartet of spaced apart slots.

\* \* \* \* \*